United States Patent
Lev et al.

(10) Patent No.: US 11,068,319 B2
(45) Date of Patent: Jul. 20, 2021

(54) CRITICAL SECTION SPEEDUP USING HELP-ENABLED LOCKS

(71) Applicant: Oracle International Corporation, Redwood City, CA (US)

(72) Inventors: Yosef Lev, New York, NY (US); Victor M. Luchangco, Cambridge, MA (US); David Dice, Burlingon, MA (US); Alex Kogan, Burlington, MA (US); Timothy L. Harris, Cambridge (GB); Pantea Zardoshti, Bethlehem, PA (US)

(73) Assignee: Oracle International Corporation, Redwood City, CA (US)

( * ) Notice: Subject to any disclaimer, the term of this patent is extended or adjusted under 35 U.S.C. 154(b) by 114 days.

(21) Appl. No.: 16/164,678

(22) Filed: Oct. 18, 2018

(65) Prior Publication Data
US 2020/0125422 A1 Apr. 23, 2020

(51) Int. Cl.
*G06F 9/46* (2006.01)
*G06F 9/52* (2006.01)
*G06F 9/54* (2006.01)

(52) U.S. Cl.
CPC .............. *G06F 9/526* (2013.01); *G06F 9/524* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 6,836,887 B1 | 12/2004 | Such | |
| 7,093,230 B2 | 8/2006 | E et al. | |
| 8,037,476 B1 * | 10/2011 | Shavit | G06F 9/526 718/104 |
| 8,468,526 B2 * | 6/2013 | Saha | G06F 9/3004 718/100 |
| 8,516,483 B2 * | 8/2013 | Chinya | G06F 9/4881 718/100 |
| 2002/0120428 A1 * | 8/2002 | Christiaens | G06F 9/465 702/186 |
| 2009/0133023 A1 * | 5/2009 | Li | G06F 9/526 718/102 |
| 2010/0275209 A1 * | 10/2010 | Detlefs | G06F 9/526 718/102 |
| 2012/0331238 A1 * | 12/2012 | McKenney | G06F 9/526 711/147 |

(Continued)

OTHER PUBLICATIONS

Tutorialspoint Simply Easy Learning, "C++ Templates", Retrieved from URL https://www.tutorialspoint.com/cplusplus/cpp_templates.htm on Sep. 10, 2018, pp. 1-5.

(Continued)

*Primary Examiner* — Kenneth Tang
(74) *Attorney, Agent, or Firm* — Robert C. Kowert; Kowert, Hood, Munyon, Rankin & Goetzel, P.C.

(57) ABSTRACT

A first data accessor acquires a lock associated with a critical section. The first data accessor initiates a help session associated with a first operation of the critical section. In the help session, a second data accessor (which has not acquired the first lock) performs one or more sub-operations of the first operation. The first data accessor releases the lock after at least the first operation has been completed.

20 Claims, 10 Drawing Sheets

(56) References Cited

U.S. PATENT DOCUMENTS

2015/0205733 A1* 7/2015 Steinmacher-Burow .................... G06F 9/526
716/150

OTHER PUBLICATIONS

John M. Mellor-Crummey, et al., Algorithms for Scalable Synchronization on Shared-Memory Multiprocessors, ACM Transactions on Computer Systems, vol. 9, No. 1, Feb. 1991, pp. 21-65.

The Open Group, "The Single UNIX Specification, Version 2: pthread_cond_wait", Retrieved from URL http://pubs.opengroup.org/onlinepubs/7908799/xsh/pthread_cond_wait.html on Sep. 17, 2018, pp. 1-3.

* cited by examiner

CRITICAL SECTION SPEEDUP USING HELP-ENABLED LOCKS

BACKGROUND

In many modern computer applications, numerous data accessors (readers and/or writers) may contend for shared data objects protected by respective locks. In some cases, the work done in a critical section by a lock holder may involve a large amount of processing and/or input/output operations, e.g., at least some of which may in principle be parallelizable. However, because the processing and/or other operations may have to be performed while protecting the shared data, in many conventional locking schemes taking advantage of the potential parallelization may present a challenge.

SUMMARY

Various embodiments of systems, apparatus and methods for speeding up critical sections using a type of lock that may be referred to as a help-enabled lock are described. According to some embodiments, a method may comprise acquiring, by a first data accessor of a plurality of data accessors (e.g., readers and/or writers) at one or more computing devices, a first lock (e.g., a help-enabled lock) associated with a first critical section. The first critical section may comprise one or more operations including a first operation. The method may further comprise initiating, by the first data accessor, a first help session associated with the first operation. The first help session may comprise implementing one or more sub-operations of the first operation by at least a second data accessor which (a) has requested the first lock and (b) has not yet been granted the first lock. The method may further comprise releasing the first lock by the first data accessor after at least the first operation has been completed.

According to at least one embodiment, a system may comprise one or more computing devices. The computing devices may include instructions that upon execution on a processor cause a first data accessor of a plurality of data accessors at the one or more computing devices to obtain a first lock associated with a first critical section. The first critical section may comprise one or more operations including a first operation. The instructions upon execution on the processor may further cause the first data accessor to initiate a first help session associated with the first operation. The first help session may include implementing, by at least a second data accessor which has not acquired the first lock, one or more sub-operations of the first operation. The instructions upon execution may also cause the first data accessor to release the first lock after at least the first operation has been completed.

According to some embodiments, one or more non-transitory computer-accessible storage media may store program instructions. When executed on or across one or more processors, the program instructions may cause a first data accessor of a plurality of data accessors to acquire a first lock associated with a first critical section. The first critical section may comprise one or more operations including a first operation. The program instructions may further cause the first data accessor to initiate a first help session associated with the first operation. The first help session may comprise implementing, by at least a second data accessor which has not acquired the first lock, one or more sub-operations of the first operation. The program instructions may also cause the first data accessor to release the first lock after at least the first operation has been completed.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION OF EMBODIMENTS

Figure 1:
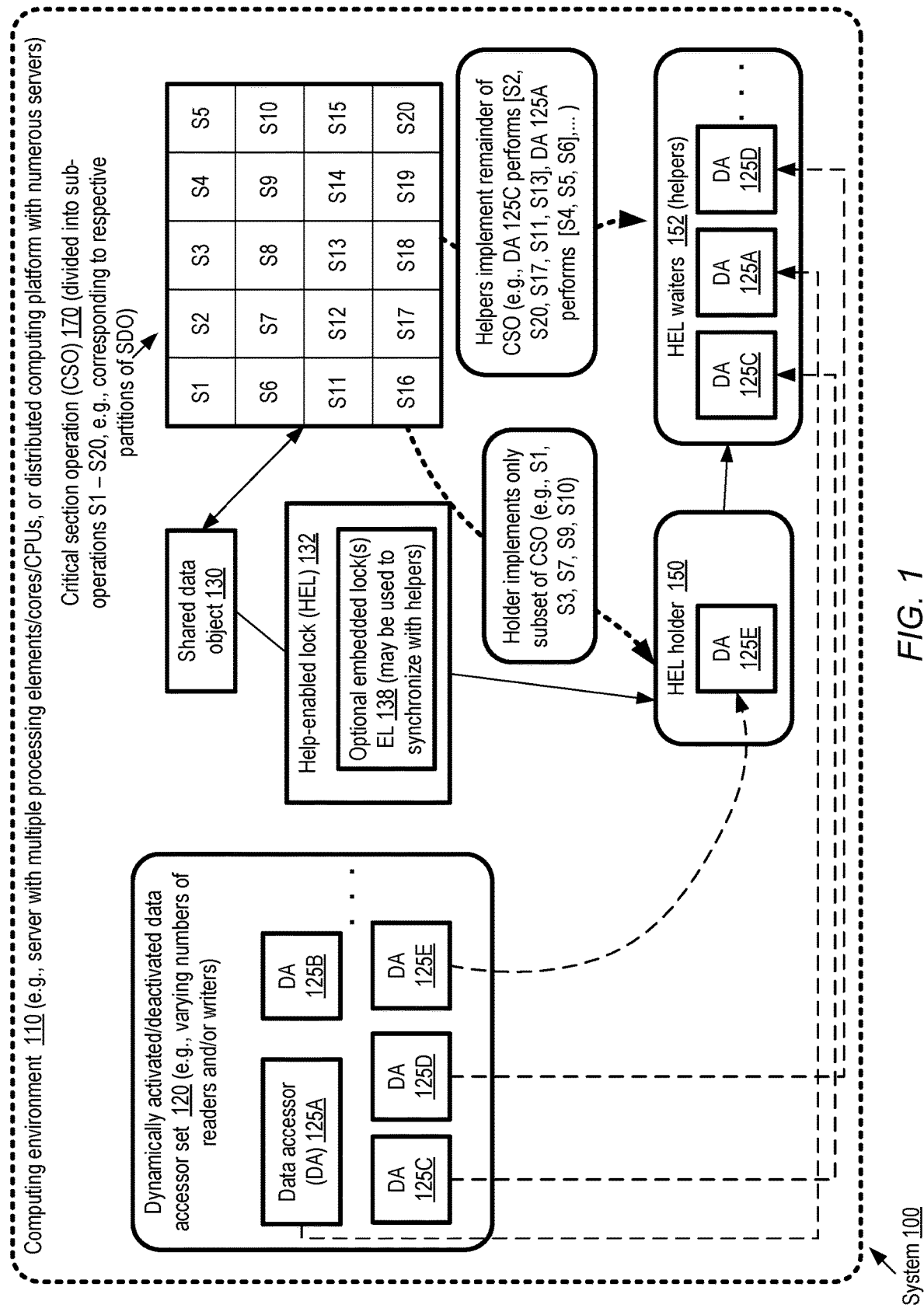
FIG. 1 illustrates an example system environment in which help-enabled locks may be employed to reduce the time taken to complete critical sections associated with operations on shared data objects, according to at least some embodiments.

FIG. 1 illustrates an example system environment in which help-enabled locks may be employed to reduce the time taken to complete critical sections associated with operations on shared data objects, according to at least some embodiments. As shown, system 100 may comprise a computing environment 110, within which a set 120 of data accessors (DAs) 125 (e.g., readers and/or writers) may run. In the depicted example scenario of FIG. 1, a plurality of data accessors including DAs 125A-125E may be running concurrently (i.e., the lifetimes of at least some of the DAs may overlap at least partly). The computing environment may also comprise one or more shared data objects (SDOs) such as SDO 130, which may be read and/or modified at various points in time by the data accessors. In various embodiments, the number of data accessors 125 may change over time; for example, there may be intervals during which no writes are being attempted or performed on a given SDO 130, periods during which no reads are being attempted or performed, periods in which numerous readers are attempting to concurrently or near-concurrently read from a given SDO, and so on. Data accessors may be dynamically activated and/or deactivated in at least some embodiments, e.g., by forking new threads or processes at a computing device or terminating such threads or processes. Similarly, the number of shared data objects may change over time as well in various embodiments. A given data accessor (such as a thread of a multi-threaded program) may perform respective critical section operations (CSOs) 170 comprising read and/or write operations, as well as associated computations/processing, on numerous SDOs during its lifetime in the depicted embodiment, as well as other types of operations that are not part of critical sections.

The computing environment 110 may comprise a single server or computing device in some embodiments (e.g., with one or more processing elements such as cores or CPUs), and multiple servers/computing devices in other embodiments. In at least some embodiments, the computing environment within which the data accessors 125 run and/or the shared data objects and associated metadata are stored may include one or more servers implementing a NUMA (non-uniform memory access) architecture. Individual ones of the SDOs 130 may be defined at any desired granularity in different embodiments e.g., one SDO may comprise a 32-bit data structure, while another SDO may be a multi-megabyte data structure.

In at least some embodiments, a category of locks referred to as help-enabled locks (HELs), and associated lock management and critical section workload sharing techniques referred to as help-enabled locking techniques, may be used to implement concurrency control with respect to SDOs 130. In the embodiment depicted in FIG. 1, for example, an HEL 132 may be used to protect access to SDO 130. At a given point in time, in various embodiments an HEL 132 may be held/owned by at most one data accessor (the HEL holder), while zero or more other data accessors may be waiting for the HEL (e.g., they may have submitted requests to acquire the HEL, but may not yet have acquired the HEL because it is already held by some other DA). In the example scenario of FIG. 1, DA 125E is a holder 150 of HEL 132, while DAs 125C, 125A and 125D are waiters 152 for HEL 132.

At least some of the work performed in a critical section associated with an HEL 130 may be divisible into sub-operations or partitions in some embodiments, such that multiple sub-operations may at least in principle be performed in parallel, or at least partially in parallel, by respective DAs. For example, in the depicted example of FIG. 1, a critical section task or operation 170 may be partitioned into twenty sub-operations S1-S20. According to at least some embodiments, an HEL holder 150 may initiate one or more help sessions while holding the HEL 132, in effect enabling or allowing any DAs that happen to be waiting for the HEL to perform or execute/implement one or more sub-operations of the critical section for which the HEL was acquired. DAs 125 that do not hold the HEL 132 but nevertheless participate in the work of the critical section (or at least make themselves available for participation in the work of the critical section) may be referred to in various embodiments as helpers or helper DAs. In various embodiments, the HEL holder may also perform some of the sub-operations of the critical section. Details regarding how the holder starts and ends such help sessions, and regarding techniques that may be employed to ensure that different helper DAs do not end up attempting the same sub-operation in various embodiments, are provided below. In the example scenario shown in FIG. 1, the HEL holder (DA 125E) may only have to implement sub-operations S1, S3, S7, S9 and S10, while helpers may perform the remaining fifteen sub-operations (e.g., DA 125C implements S2, S20, S17, S11 and S13; DA 125A implements S4, S5 and S6; and so on). Note that in some scenarios, there may not necessarily happen to be any waiters 152 for a given HEL 132 during a time period in which that HEL is held, so the HEL holder 150 may end up performing the entire critical section operation in such cases in various embodiments.

As one skilled in the art will appreciate in light of this disclosure, certain embodiments in which help-enabled locking techniques are implemented may be capable of achieving various advantages, including enabling substantially higher throughputs and lower response times for certain types of data access workloads by completing critical sections more quickly than if other types of locks were employed. Furthermore, the speedup of critical sections may be accomplished in various embodiments by enabling data accessors that would otherwise simply be waiting for a lock (and not doing anything useful) to perform part of the critical section operations. The overall wait time for locks may also be reduced in various embodiments. In addition, the help-enabled locking techniques described may be deployed in at least some embodiments (e.g., by augmenting existing lock implementations using dynamic libraries) without requiring application code to be modified, which is a significant benefit for long-running applications in production environments. A variety of use cases may benefit from the techniques, such as workloads in which the shared data objects comprise commonly used sets or sequences of elements (e.g., arrays, lists, hash tables, hash map based sets, tree based sets etc.) such that processing sub-operations can be performed on the elements at least partly in parallel or independently of one another. The exact speedup of the critical sections may of course vary depending on various factors in different embodiments, such as the extent to which the work of the critical section is easily subdivided into sub-operations that can be safely performed concurrently, the total number of concurrent or near-concurrent data accessors, the relative timing in which data accessors request the help-enabled lock, and so on.

Example pseudo-code set 1 (EPS1) shown below indicates, at a high level, an example approach towards implementing help-enabled locking techniques which may be employed in some embodiments. A C++ style syntax is used in EPS1 by way of example; note that any appropriate programming language may be used in various embodiments. In EPS1, data accessors are assumed to be threads running within a single multi-CPU server, and the HelpEnabledLock structure referenced in line 1 corresponds to the HEL 132 shown in FIG. 1.

```
-----EPS1: Example pseudo-code set 1 for HEL algorithms-------
1: HelpEnabledLock HEL;
2: // The helper function
3: // Applies a function foo( ) to a region of a set
4: // The function is assumed to be multi-thread safe, and can
   therefore be executed by
5: // multiple helpers threads in parallel
6: struct helperFunArgs {
7:     Iterator regionIters[ ];
8:     volatile int* nextRegionIndex;
9: int numRegions; // number of regions of shared data object
10: };
11: void helperFun(helperFunArgs * args) {
12:         // Get the iterator for the next unprocessed region
13:         int regionIndex = fetchAndInc(args→nextRegionIndx);
14:         while (regionIndex < args→numRegions) {
15:             Iterator iter = regionIters[regionIndex];
16:             // apply foo( ) to each element of the region
17:             while(++iter != iter.end( )) {
18:                 *iter = foo(*iter)
19:             }//end while
20:             regionIndex = fetchAndInc(args→nextRegionIndx);
21:         } // end while
22: }// end helperFun
23: // data accessor workflow begins here
24: // data accessor acquires HEL
25: HEL.lock( );
26: // HEL is now held exclusively; holder/owner can initiate help session
27: // First, owner sets helper function arguments
28: helperFunArgs args;
29: // subdivide the SDO into regions which can be processed by helpers
30: args.regionIters = sharedDataObject.getIterators(partitionParams);
31: // set starting region for helpers
32: // (holder may reserve some regions for itself by setting a
    different nextIndex than −1)
33: volatile nextIndex = −1;
34: args.numRegions = sharedDataObject.getRegionCount( );
35: args.nextRegionIndex = &nextIndex;
36: // holder initiates help session, providing helperFun and its arguments
37: // after this point, multiple threads may be executing helperFun,
38: // so the owner cannot assume it has exclusive access to the SDO
39: HEL.askForHelp(helperFun, args);
40: // help is not guaranteed; there may not be any waiters.
41: // The lock owner may invoke helperFun itself to ensure that the
    work gets done;
42: // note that helperFun only returns when all regions are being
    processed, or none
43: // remain to be processed
44: helperFun(args);
45: // wait for help session to be completed
46: // when stopHelping( ) returns, the holder is guaranteed that no
    other threads are
47: // executing helperFun
48: HEL.stopHelping( );
49: // help session is complete; execute any other work of the critical
    section if needed
50: // and then release the HEL
51: doRemainingCSWork( );
52: HEL.unlock( );
----End EPS1 -----------------------------------
```

In embodiments in which logic similar to that shown in EPS1 is employed, the workflow of a data accessor begins with an attempt to acquire a help-enabled lock (line 25). After the lock is acquired, the holder of the lock sets up arguments of a helper function (lines 28-35) and then invokes an "askForHelp" function (line 39), in effect indicating that the holder/owner of HEL is willing to accept help in completing the work of the critical section protected by HEL from some number of waiters for HEL, if any such waiters happen to become available for sharing the work. Of course, in some scenarios it may be the case that no waiters exist during the critical section, in which case the lock owner may perform the entire critical section itself. In embodiments in which EPS1-like logic is employed, the lock holder may itself invoke the helper function ("helperFun", line 44), using the arguments that were set earlier, and perform some or all of the sub-operations of the critical section.

The example critical section sub-operations in EPS1 comprise applying a function "foo" (line 18), within the helper function, to a number of elements (accessed using the "iter" variable) of a region or portion of a shared data object ("sharedDataObject", introduced in line 30 of EPS1, corresponding to SDO 130 of FIG. 1). For example, in one example scenario the shared data object may comprise an array or table of, say, 100000 records, which may be subdivided into 10 regions of 10000 records (elements) each. In at least some embodiments, an indication of an iterator (e.g., similar to "regionIters" of line 7 of EPS1) may be provided to helpers by the lock owner, to enable the helper to demarcate or identify the helper's sub-operation(s) of the critical section. In one embodiment, an indication of the function (similar to function "foo" of EPS1) to be applied to elements (or all) of a portion of a shared data object in a sub-operation by a helper may also be passed to a helper as an argument. For example, a pointer to such a function, or the name of the function, may be provided as a parameter to the helpers in some implementation. In EPS1, an atomic fetch and increment ("fetachAndInc") operation may be applied to the "nextRegionIndex" variable of the helper function arguments (e.g., in lines 13 and 20) by a data accessor (the HEL owner or a helper) to ensure that different data accessors work on distinct portions of the shared data object. Other synchronization approaches to avoid duplicating work (and/or to avoid corrupting the shared data object) by different data accessors working concurrently may be employed in different embodiments. In some embodiments, the lock owner may reserve some regions of the shared data object for itself, by setting a starting index value ("nextIndex" in line 33 of EPS1) that prevents any helpers from processing one or more regions. In various embodiments, the sub-operations of the critical section, which may potentially be performed concurrently by several data accessors, may be expected to either (a) be inherently data parallel (i.e., safe to execute in parallel with no synchronization) or (b) use explicit synchronization if they are not inherently data parallel.

The helper function (lines 11-22 of EPS1) may be designed in such a way in at least some embodiments that a caller (the owner of HEL, or a waiter for HEL) would return from it only after all the sub-operations of the critical section are either completed (either by the current caller, or by some other caller), or have been taken up by some other data accessor. Thus, upon the return from the helper function invocation on line 44, the HEL owner would be guaranteed that all the sub-operations are either underway (e.g., by a helper that has not yet finished its sub-operation) or completed (e.g., by some combination of the owner and zero or more helpers). The lock owner may, in some embodiments, invoke the equivalent of a "stopHelping" function (line 48 of EPS1) to terminate a help session, which may involve waiting for the completion of sub-operations by any remaining helpers.

A critical section protected by HEL may in some embodiments comprise several types of tasks or operations—some that can be cleanly divided into sub-operations that can be performed by helpers (if available), and some that cannot be divided and have to be performed by the lock owner/holder. After the sharable part of the critical section is complete (e.g., when the lock holder returns from "stopHelping" in EPS1), the remaining portion of the critical section work (if any) may be performed by the holder (line 51) and the HEL may be released (line 52 of EPS1). Note that although only a single help session is illustrated in EPS1, a help-enabled locking algorithm may allow multiple help sessions (involving parallel sub-operations being performed on the same data object, or on different data objects) within a given critical section in at least some embodiments, with the lock owner having exclusive access to any resources protected by the lock between such sessions.

In at least one embodiment, a help-enabled lock 132 may be implemented using an embedded lock (e.g., EL 138 of FIG. 1). For example, an operating system or other execution framework in which SDOs 130 are accessed may support various types of baseline locking mechanisms or lock types, and an enhanced/augmented locking mechanism supporting help sessions of the kind introduced above may be in effect be built on top of one or more of the baseline locking mechanisms. In an example scenario in which an object-oriented programming approach (e.g., similar to that of C++ or Java™) is employed, an existing lock may be embedded in a help-enabled lock class that provides wrappers for lock/unlock functions as well as the equivalent of the "askForHelp" function introduced above (to start help sessions) and the equivalent of the "stopHelping" function introduced above (to end help sessions). In such an example scenario, the embedded lock may only be required to support lock and unlock functions, with the helping-related features built on top of the embedded lock's own features. In at least some embodiments in which such embedded locks are employed, the helping functionality introduced above may be added to the existing lock mechanism, without changing the implementation of the existing lock mechanism, and/or without requiring recompilation of at least some of the code of the implementation.

Example pseudo-code section EPS2 shown below, also expressed using C++ like syntax, demonstrates one approach involving the use of an embedded lock for implementing help sessions, which may be used in some embodiments. Note that any appropriate programming language may be used in various embodiments in which techniques similar to those of EPS2 are deployed. In EPS2, a C++ template class is used for the "HelperLock" class (of which HEL 132 of FIG. 1 may represent one instance), with the embedded existing lock type (corresponding to EL 138 of FIG. 1) being a type argument (see, e.g., line 49 of EPS2). Data accessors are assumed to be threads running within a single multi-CPU server in EPS2, although similar approaches to that of EPS2 may be employed for other types of data accessors (e.g., independent processes running in a distributed computing environment) in at least some embodiments. In EPS2, the "HelperFunction" class corresponds to the helper function of EPS1.

At a high level, the properties of an example implementation in which logic similar to that of EPS2 is employed may be summarized as follows with respect to at least some embodiments. A HelperLock object HL (which contains an embedded lock L) may be either in a locked state or in an unlocked state (initially, the state may be unlocked). A data accessor (such as a thread T) that was the most recent to lock or acquire HL is the lock owner/holder. The embedded lock L may also be in a locked or unlocked state, but L may be in an unlocked state even when HL is locked by some thread T. (This may be the case, for example, during a help session.) When a thread T calls HL.Lock( ) an attempt to acquire the embedded lock L is made by calling L.lock( ) (line 88 of EPS2). When the call to L.lock( ) returns, there are two possibilities: (1) HL is unlocked, in which case HL.Lock( ) returns, making T the lock owner; or (2) HL is locked, which means that T is in a help session. In this latter scenario, T becomes a helper (unless there are already enough helpers, as determined using the "myHelperID" variable in line 99), executes the helper function, and when done calls L.lock( ) again. Note that if the lock holder limits the maximum number of helpers (e.g., by setting numHelpersNeeded to a non-zero value in line 154), in some embodiments one or more data accessors that are available to act as helpers may nevertheless determine that they cannot act as helpers (i.e., that they cannot perform sub-operations of the critical section) because the number of current helpers has reached the limit. The comments included within EPS2 help explain various other aspects of the example implementation.

```
-----EPS2: Example pseudo-code set 1 for HEL using embedded existing lock -------
1: /**
2:  * HelperLock: adds helping functionality to an existing lock type
3:  * (denoted as the embedded lock type, captured by the lock_t template
4:  * argument)
5:  *
6:  */
7: template <typename lock_t>
8: class HelperLock {
9: public:
10:     /**
11:      * HelperLock interface
12:      */
13:     void lock( );
14:     // The helper function and its arguments are captured in an object that is
15:     // derived from the following HelperFunction class, which only defines one
16:     // virtual method, Run( ), that executes the helper function. Any arguments
17:     // to the helper function and/or return values may be captured by the
18:     // subclass that implements the Run( ) method.
19:     //
20:     // In addition, the Run method gets an argument that provides a unique ID
21:     // that is assigned for each helper thread in a help session; the ID
22:     // will be in the range of 0 to the total number of helping threads, and can
23:     // be used to simplify and optimize synchronization in the helper function
24:     // between all threads executing in the help session. (A simple example
25:     // is where the helper function needs to return a value, and we would like
26:     // to avoid synchronizing concurrent stores of the return values by the
27:     // different helper threads.)
28:     //
29:     class HelperFunction {
30:     public:
31:         virtual void Run(int helperId) = 0;
```

-continued

```
32:    };
33:    // askForHelp: called by lock holder to start a help session in which waiting
34:    // threads may help with a given operation. Parameters include the helper function
35:    // (of a type that is a descendent of the HelperFunction class) describing the work
36:    // to perform), and an optional maxHelpers argument that allows the lock owner
37:    // to restrict the number of helper threads that are running concurrently
38:    // with it. If maxHelpers is not set, all available threads that are waiting for the
39:    // lock may call the helper function during the help session.
40:    //
41:    void askForHelp(HelperFunction* fun, int maxHelpers);
42:    // stophelping: Ends the help session, waiting for all helper threads to be done and
43:    // resume waiting for the lock. After stopHelping returns, no other thread
44:    // may be running code that requires the embedded lock.
45:    //
46:    void stopHelping( );
47:    // Constructor
48:    //
49:    HelperLock(lock_t& lockToAugment):embeddedLock(lockToAugment) {
50:    }
51: private:
52:    /**
53:     * Data members
54:     */
55:    // Information about an ongoing help session.
56:    //
57:    // All members are protected by the embedded lock, except numHelperThreads
58:    // which is modified using atomic fetch-and-increment/decrement operations.
59:    //
60:    struct HelpSessionInfo {
61:        bool inHelpSession = false;
62:        HelperFunction* helpFun = NULL;
63:        // Info on current session
64:        int numHelpersNeeded = 0;
65:        volatile int numHelperThreads = 0;
66:    };
67:    lock_t& embeddedLock;
68:    HelpSessionInfo hsInfo;
69:    // A conditional variable helpersWaitCV is used to sleep/wakeup non-active
70:    // helpers. It is associated with an additional lock, waitingMutex, rather than the
71:    // embedded lock, because the embedded lock may be of any type, and may not
72:    // support conditional variables. We also add a counter to avoid a situation
73:    // where a non-active thread waits for a notification after the session that it
74:    // had entered has already been completed.
75:    //
76:    // CompletedSessions is only modified when holding both the embedded lock
77:    // and the waiting mutex, and read when holding at least one of them.
78:    //
79:    pthread_mutex_t waitingMutex;
80:    volatile int numCompletedSessions = 0;
81:    pthread_cond helpersWaitCV; // conditional variable
82: public:
83:    /**
84:     * Interface implementation
85:     */
86:    void lock( ) {
87:        while (true) {
88:            embeddedLock.lock( );
89:            // If not in a help session, it's a regular lock acquisition, return
90:            if (!hsInfo.inHelpSession) return;
91:            /**
92:             * In a help session, and I'm holding the embedded lock
93:             */
94:            bool holdingEmbeddedLock = true;
95:            int sessionId = numCompletedSessions;
96:            // are more helper threads needed?
97:            int myHelperId = fetchAndInc(&hsInfo.numHelperThreads);
98:            if (hsInfo.numHelpersNeeded == 0 ||
99:                myHelperId < hsInfo.numHelpersNeeded) {
100:               // I'm an active helper: call helper function with helper ID.
101:               //
102:               // Before the actual call, release the embedded lock to
103:               // let other threads become helpers, and to allow the lock
104:               // owner to terminate the help session. Also, capture a local
105:               // copy of the helper function pointer to avoid making it
106:               // volatile, as it will be read after releasing the embedded
107:               // lock.
108:               //
109:               HelperFunction *hfun = hsInfo.helpFun;
110:               embeddedLock.unlock( );
```

```
111:            holdingEmbeddedLock = false;
112:            hfun->Run(myHelperId);
113:            // Done helping, fall through to wait for the help session
114:            // to complete
115:        } else {
116:            // My help is not needed, release the embedded lock.
117:            embeddedLock.unlock( );
118:        }
119:        // Decrement numHelperThreads to allow lock owner to terminate
120:        // the help session.
121:        //
122:        fetch_and_dec(&hsInfo.numHelperThreads);
123:        /**
124:         * Done helping (or my help was not needed).
125:         * Wait for the help session to complete,
126:         * then loop back to re-acquire the embedded lock.
127:         */
128:        pthread_mutex_lock(&waitingMutex);
129:        // Check that we are still in the session we entered, to avoid
130:        // sleeping on the CV after the session completes,
131:        // (and not being woken up); perform check in a loop to deal with
132:        // potential spurious wakeups.
133:        //
134:        // Note that numCompletedSessions is only read under
135:        // waitingMutex, held upon return from the wait call.
136:        //
137:        if (sessionId == numCompletedSessions) {
138:            // loop to deal with spurious wakeups
139:            while (sessionId == numCompletedSessions) {
140:                pthread_cond_wait(&helpersWaitCV,
141:                    &waitingMutex);
142:            } // end while
143:        } // end if
144:        pthread_mutex_unlock(&waitingMutex);
145:        // The help session we entered is done. Loop back.
146:    } // end while(true)
147: } // end lock( )
148: // askForHelp: HEL owner starts a help session
149: void askForHelp(HelperFunction* fun, int maxHelpers) {
150:    // Initialize hsInfo and unlock the embedded lock
151:    //
152:    hsInfo.helpFun = fun;
153:    hsInfo.inHelpSession = true;
154:    hsInfo.numHelpersNeeded = maxHelpers;
155:    hsInfo.numHelperThreads = 0;
156:    embeddedLock.unlock( );
157: } // end askForHelp
158: // stopHelping. HEL owner terminates a help session
159: void stopHelping( ) {
160:    // Acquire the embedded lock, preventing any other threads from joining
161:    // the help session.
162:    embeddedLock.lock( );
163:    hsInfo.inHelpSession = false; // Not really necessary until we release the
164:    // HEL, but it's cleaner to do it here.
165:    // No need to do anything if no one helped us (just an optimization)
166:    if (hsInfo.numHelperThreads == 0) return;
167:    /**
168:     * We had helpers. Update numCompletedSessions to indicate that the
169:     * current session is done, wake up any threads that may be blocking on
170:     * the CV, and wait for any helper threads that may still be executing
171:     * the helper function to finish.
172:     */
173:    // 1. Update numCompletedSessions: done while holding waitingMutex as a
174:    // threads that is about to block on the CV in this session has to read
175:    // numCompletedSessions atomically with its (potential) call to wait( ).
176:    //
177:    pthread_mutex_lock(&waitingMutex);
178:    numCompletedSessions++;
179:    pthread_mutex_unlock(&waitingMutex);
180:    // 2. Wakeup threads blocked in the session
181:    pthread_cond_broadcast(&helpersWaitCV);
182:    // 3. Wait for all helping threads to complete.
183:    //
184:    while (hsInfo.numHelperThreads != 0) ;
185:    // Additional notes:
186:    //
187:    // a) Waiting after the call to broadcast is an optimization, so
188:    // that the logic run by the blocked threads once they wake up can be
189:    // executed while other helping threads are still executing the helper function
```

```
190:    // (if the HEL owner finishes the last available sub-operation long
191:    // before some helper threads finish their sub-operations, that can make a
192:    // difference.)
193:    //
194:    // b) We could add another counter to distinguish active helper threads
195:    // (that may be running the helper function) from those that do not,
196:    // and wait only for the active ones. The others will notice that the
197:    // help session is done at some point later on and will not touch
198:    // any state that the HEL owner cares about.
199: } // end stopHelping
200: void unlock( ) {
201:    embeddedLock.unlock( ); // simply release embedded lock
202: } // end unlock
203:};
----End EPS2 --------------------------------
```

In embodiments in which an approach similar to EPS2 is employed, a "HelpSessionInfo" object (whose elements are defined in lines 60-66 and set in lines 152-155) may contain a pointer to the function ("helpFun") that is to be applied by helpers during a help session. The lock holder may set a limit on the number of concurrent helpers in some embodiments, e.g., using the "numHelpersNeeded" variable. The equivalent of a "numCompletedSessions" variable may be used to indicate whether the current help session has been completed or not in some embodiments. A helper saves the "numCompletedSessions" value (line 95) before doing its sub-operations of the critical section, and determines that the session has ended if the "numCompletedSessions" value has changed (this is checked in lines 137-143); the lock owner modifies "numCompletedSessions" (lines 177-179) to end a help session. In the "askForHelp" function (lines 149-157 of EPS2), which corresponds to starting a help session in various embodiments, the HEL holder sets the help session information ("hsInfo") arguments that will be read by helpers. The HEL holder then releases the embedded lock, enabling potential helpers to (a) acquire the embedded lock (line 88), (b) update the "numHelperThreads" variable (line 97) using an atomic operation (e.g., fetch-and-increment) to indicate that they are active helpers, (c) release the embedded lock (line 111) and (d) perform part of the critical section work. The release of the embedded lock prior to performing the sub-operation of the critical section may enable other helpers to also perform their sub-operations in various embodiments. The updating of "numHelperThreads" (or some similar variable/signal) may comprise providing an indication by a given helper that at least one sub-operation of the critical section is going to be implemented by the helper (in effect notifying other data accessors that the sub-operation has been claimed by the helper) in various embodiments. In EPS2, a broadcast primitive associated with a conditional variable is used (line 181) to notify one or more other data accessors that the help session has ended; in some embodiments, other approaches to signal the end of the help session may be used.

In various embodiments, any of numerous variations of the basic logic illustrated in EPS2 may be employed to achieve the overall objectives of shortening critical sections by enabling waiting data accessors to perform some of the work of the critical section concurrently. The details of various aspects of the implementation (such as the use of a waiting mutex etc.) may differ in different embodiments. For example, in EPS2, the helper function is called once by each helper; in some embodiments a given helper may instead call the helper function repeatedly (e.g., after acquiring the embedded lock between successive calls to the helper function). One advantage of the latter approach would be to optimize the synchronization between the lock owner and the helpers, taking advantage of the fact that helpers are executing code under the embedded lock between successive invocations of the helper function. Also, in EPS2, synchronization between/among the helpers and the holder, as well as the logic to decide when to return from the helper function, is implemented in the helper function itself; in some embodiments, alternate approaches may be taken towards synchronization and return logic. In at least one embodiment, built-in helper functions for common use cases (such as parallelizing a "for" loop) may be provided as part of the HEL design. In another variation, in some embodiments, the "stopHelping" function may return values that may potentially be useful for the lock owner, such as the number of helpers which participated in the help session, the fraction of the work that was performed by helpers, how many NUMA nodes were involved in the help session, and so on. Such information may be used by the lock owner, for example, to determine whether it is worthwhile to begin another help session (e.g., for another part of the critical section). In one embodiment, the lock owner may indicate (e.g., via parameters) the specific types of information to be returned from the "stopHelping" function. The approach illustrated in the EPS2 example is generic, and may be applied to augment a variety of different lock types without for example re-implementing (or even recompiling) the code of the underlying lock types in various embodiments.

In some embodiments, as in the approaches discussed above in the context of EPS1 and EPS2, at some stage (e.g., in operations corresponding to line 184 of EPS2) an HEL holder may wait until all the helpers have completed their sub-operations before proceeding with other work. In other embodiments, a somewhat different approach may be taken. If the primary lock holder or helpers discover that no unassigned work of the critical section operation that can be parallelized is left unassigned in such an embodiment, that is, that there is no additional helping that can be taken up, they may return from the lock operation while residual helpers (helpers that have begun but not yet finished their sub-operations) are still running. This may be referred to as an "early return" optimization in some embodiments. Early return optimization may allow at least some additional work to be completed more quickly than if all helpers have to complete their sub-operations before any of the data accessors can proceed. Note that new help sessions may not be started while an existing session is in this type of "almost done" state in various embodiments. Note also that in some cases, this type of optimization may not necessarily be safe, e.g., if existing code is being converted naively to use help-enabled locks. Consider an example scenario where one data accessor DA1 obtains the HEL, and some of the waiting data accessors help with I/O that is to be performed under the lock. Normally, when DA1 returns from the lock operation, the I/O started within the critical section would be expected to be finished, but if DA1 were permitted to return early, before all the helpers were done, this would not necessarily be the case. However, for some types of use cases (e.g., a scenario in which a hash table is being re-sized with the aid of one or more helpers), early return optimization may be safe and potentially beneficial. Even in embodiments in which these types of early returns are permitted, overlap between help sessions may be impermissible. In one embodiment, a parameter indicating whether early returns are permitted may be passed when a help-enabled lock is initialized. In other embodiments, a parameter indicating whether early returns are permitted may be passed as part of individual lock acquisition requests.

Figure 2:
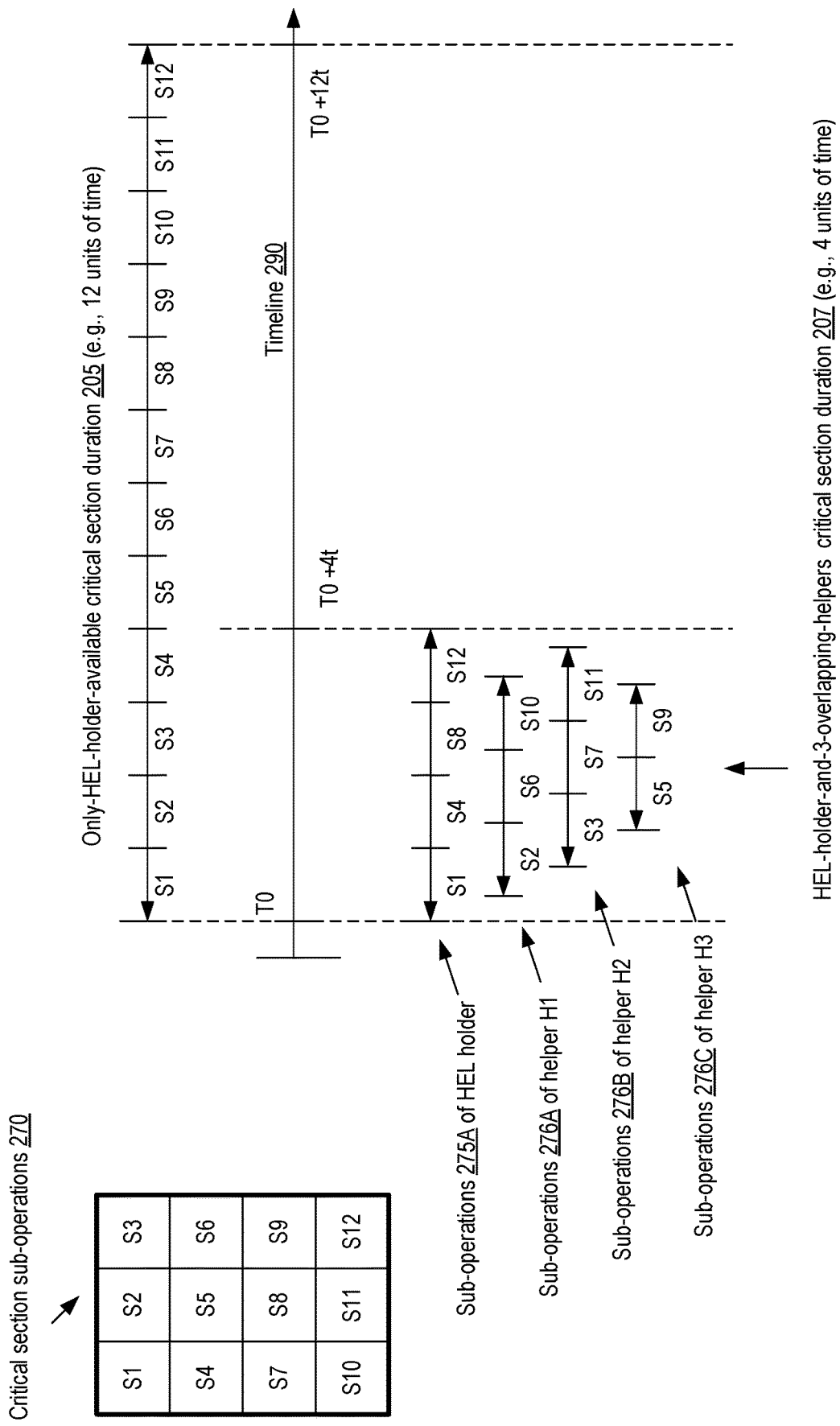
FIG. 2 illustrates example timelines of completing a critical section with and without the use of a help-enabled lock, according to at least some embodiments.

FIG. 2 illustrates example timelines of completing a critical section with and without the use of a help-enabled lock, according to at least some embodiments. In the depicted example scenario, a critical section may comprise 12 sub-operations 270 (S1-S12), with each sub-operation expected to require approximately similar levels of effort or resources (e.g., some combination of CPU cycles, I/O operations, etc. at a given server or computing device). Timeline 290 shows two example of the total amount of time it may take to finish the sub-operations 270.

If only the lock holder performs the sub-operations S1-S12, critical section duration 205 may comprise approximately 12 units of time (as indicated by the notation T0+12t, where T0 is the starting time of the critical section), one unit for each of the sub-operations performed sequentially in the depicted example. In contrast, consider an alternative scenario in which three other data accessors (apart from the lock holder) happen to attempt to acquire a help-enabled lock (of the kind discussed above in the context of FIG. 1, EPS1 and/or EPS2) being used to protect the critical section, say within the first two time units. If such data accessors become helpers during a help session initiated by the lock owner, the work may be distributed among the helpers and the lock owner and completed within approximately four units of time as shown in duration 207 in the depicted embodiment. Depending on the sequence and arrival times of the other data accessors that are unable to acquire the lock, the work of the critical section may be distributed as follows. The lock owner may perform sub-operations 275 (e.g., S1, S4, S8 and S12). A first helper H1, which begins waiting for the lock shortly after the holder acquires it, may perform sub-operations 276A (e.g., S2, S6 and S10); a second helper may perform sub-operations 276B (e.g., S3, S7 and S11); and the third helper may perform sub-operations 276C (e.g., S5 and S9). The total time taken may be reduced from 12 units in the lock-holder-only scenario to approximately 4 units (T0+4t) in the depicted 3-helper scenario. Of course, the total time may be reduced by different factors depending on the relative arrival times of the helpers; the scenario depicted in FIG. 2 is not intended to be limiting with regard to the potential benefits of using help-enabled locks.

Figure 3:
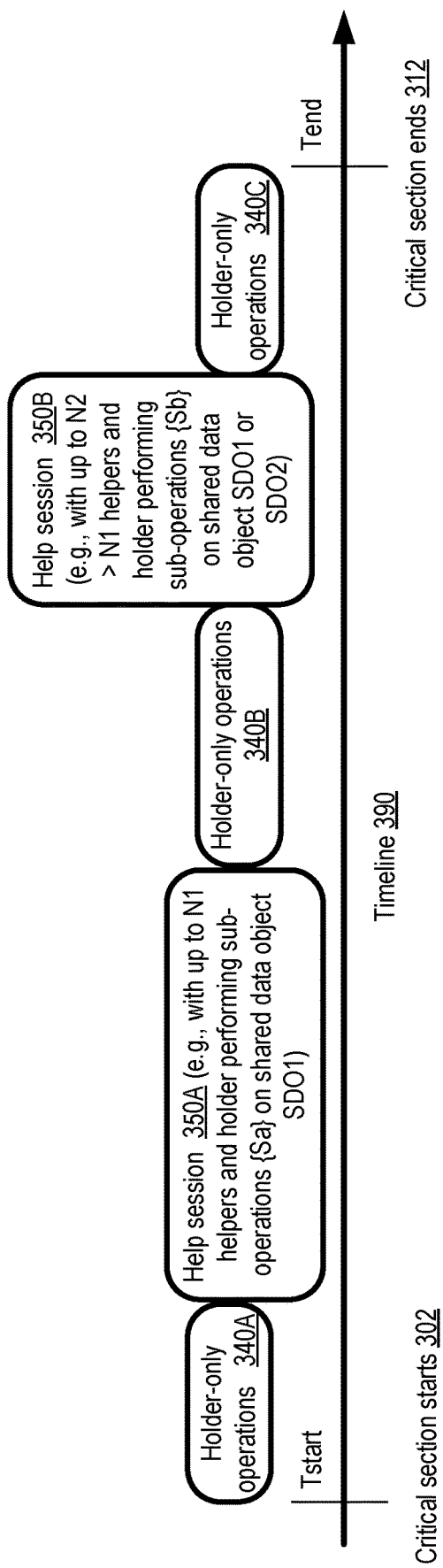
FIG. 3 illustrates example scenario in which a critical section may comprise a plurality of help sessions, according to at least some embodiments.

In at least some embodiments, as indicated earlier, a critical section may comprise several different types of operations, one or more of which may potentially be sped up by using respective help sessions of the kind introduced earlier. Other portions of the critical section activities may sometimes be harder to parallelize. FIG. 3 illustrates example scenario in which a critical section may comprise a plurality of help sessions, according to at least some embodiments. In the depicted example scenario, a critical section starts (indicated by label 302) at time Tstart along timeline 390.

A first phase of the critical section may comprise a set of operations 340A that may not be subdivided for distribution among lock waiters (e.g., because the operations are inherently single-threaded, because the overhead or complexity of subdividing the operations is too high relative to the potential benefit, and/or for other reasons) in the depicted embodiment. In a second phase of the critical section, a help session 350A may be initiated by the lock holder. During this phase, up to N1 helper threads (if available) and the lock holder may collectively perform a set of sub-operations {Sa} of the critical section, e.g., applying one or more functions to respective portions of a shared data object SDO1.

Help session 350A may be followed by another phase of holder-only operations 340B in the depicted example scenario. Then, a second help session 350B may be initiated, in which a second set of sub-operations {Sb} may be distributed among up to N2 helpers, if available, in the depicted embodiment. The optimum or maximum number of helpers that may participate in a given help session (e.g., N1 or N2, in sessions 350A and 350B respectively) may depend on, for example, the nature of the shared data on which the work is to be performed, how easy it is to partition or iterate over the shared data, and so on. In some embodiments in which a critical section comprises multiple help sessions, the same shared data (e.g., SDO1) may be accessed during different help sessions; in other embodiments, different shared data objects (e.g., SDO1 in session 350A, SDO2 in session 350B) may be accessed/processed in different help sessions. Similarly, in some embodiments, the same helper function may be implemented during different help sessions of a given critical section, while in other embodiments, different helper functions may be applied during the different help sessions (either to the same shared data, or to different shared data objects). In the example depicted in FIG. 3, the final phase of the critical section may comprise a third set of one or more holder-only operations 340C, and the critical section may end (label 312) at the conclusion of this phase. Note that the sequence illustrated in FIG. 3 is not intended to be limiting; a given critical section may comprise one or more help sessions, interspersed with any number (including zero) of holder-only operation phases of the kind shown in FIG. 3 in various embodiments. Note also that, as indicated earlier, the initiation of a help session by a lock holder in various embodiments does not necessarily imply that any helpers will participate in the help session. A lock owner may for example start a help session, and end up (if no helpers arrive or volunteer) having to complete all the sub-operations that could potentially have been implemented by helpers. In at least one embodiment, a waiter for a help-enabled lock may not necessarily participate in a help session; e.g., helping may be voluntary, and some data accessors may decide based on various factors or conditions not to participate in a given help session.

Figure 4:
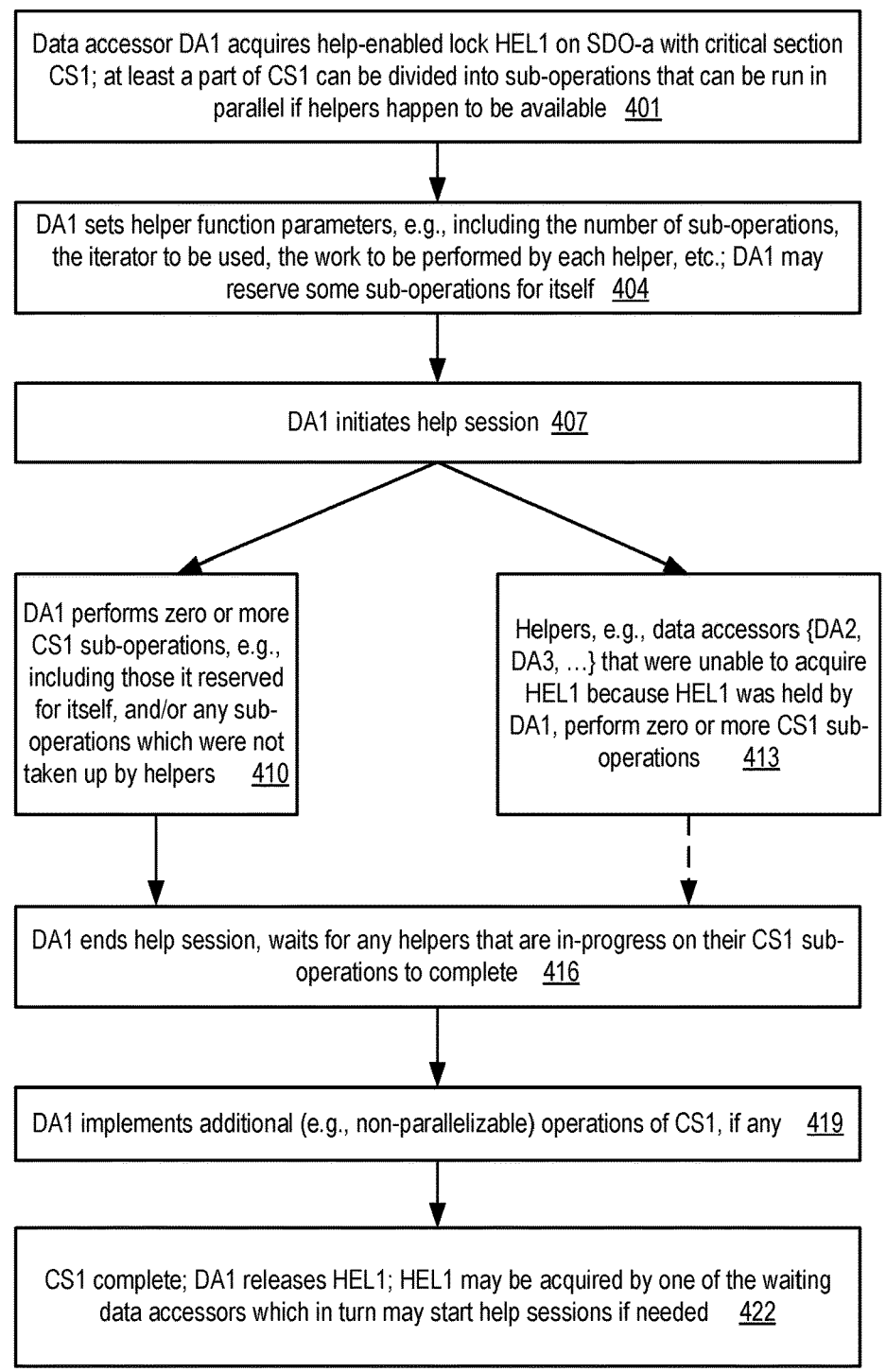
FIG. 4 is a flow diagram illustrating aspects of operations which may be performed by data accessors in a computing environment in which help-enabled locks are used, according to at least some embodiments.

FIG. 4 is a flow diagram illustrating aspects of operations which may be performed by data accessors in a computing environment in which help-enabled locks are used, according to at least some embodiments. As shown in block 401, a data accessor DA1 may acquire a help-enabled lock HEL1 (similar to HEL 132 of FIG. 1), associated with a critical section CS1 and a shared data object SDO-a (on which for example, one or more operations or tasks of CS1 may be performed) in some embodiments. At least one operation of CS1 may be partitionable or divisible relatively easily in various embodiments, e.g., the operation may sub-divided into sub-operations that can safely be performed or run in parallel if helpers happen to become available to perform the sub-operations.

The HEL1 holder, DA1, may set one or more helper function parameters or arguments in various embodiments (block 404), e.g., as part of the preparation for a help session in which other data accessors (that have attempted to acquire HEL1 but have not yet acquired it because it is held by DA1) may participate. The arguments/parameters may, for example, include the number of sub-operations that can potentially be performed in parallel, an iterator to be used by a helper to identify that helper's sub-operation(s), the work (e.g., function) to be performed in a given sub-operation, and so on in different embodiments. In at least some embodiments, DA1 may reserve or set aside some of the sub-operations for itself—that is, not all the sub-operations may necessarily be made available for potential helpers.

DA1 may initiate a help session, enabling waiters on HEL1 to perform one or more sub-operations of CS1 (block 407) in the depicted embodiment. The specific action that cause a help session to be initiated may vary in different embodiments. In some embodiments, for example, invoking a function similar to the askForHelp function introduced above in the context of EPS1 and/or EPS2 (which may include setting some of the helper function parameters corresponding to block 404) may constitute initiating the help session. In other embodiments, providing a signal using some other mechanism to data accessors that may be waiting for HEL1 (or may arrive later on while HEL1 is held by DA1) may constitute initiating the help session.

After the help session is initiated, zero or more of the CS1 sub-operations may be performed by helper data accessors that were unable to acquire HEL1 because HEL1 was held by DA1 in the depicted embodiment (block 413). The number of active helpers (data accessors that actually manage to perform CS1 sub-operations) may depend on various factors in different embodiments, such as limits that may be set (e.g., by DA1) on the maximum number of helpers, the number of processors/cores/NUMA nodes available for the data accessors, the number of sub-operations into which the CS1 operation can be cleanly divided, the relative timing of the attempts by the other data accessors to acquire HEL1, and so on. Several helpers may perform their sub-operations over time periods that overlap at least in part with one another in some embodiments—e.g., at a given point in time, multiple helpers may be working on respective sub-operations. A given helper may perform multiple sub-operations in at least one embodiment.

DA1 itself may perform zero or more of the CS1 sub-operations in various embodiments (block 410). These sub-operations may, for example, comprise a set of sub-operations that DA1 had reserved for itself in some embodiments, and/or any sub-operations that were not taken up by helpers. Some or all of the sub-operations performed by DA1 may also potentially be performed at least partly in parallel with other sub-operations being performed by helpers. The overall benefit of the parallelization, with respect to shortening or speeding up the critical section CS1, may depend on various factors in different embodiments, such as the number of concurrent helpers, the number of sub-operations into which the parallelizable CS1 operation has been divided, and so on.

In various embodiments, DA1 may eventually end the help session (block 416), e.g., after it has determined that there are no remaining sub-operations that have (a) not yet been taken up by helpers or (b) been completed (either by helpers or by DA1 itself). DA1 may wait for any in-progress helpers to complete their respective portions of the work in such embodiments. If there are additional (non-parallelizable) portions of CS1 that remain, DA1 may perform them in the depicted embodiment (block 419). Note that while in the example workflow illustrated in FIG. 4, only a single help session is started by the HEL1 holder, in general a given critical section may include any number of help sessions (and any number of phases of non-parallelizable operations) in various embodiments, as discussed in the context of FIG. 3. After the operations of CS1 are completed, DA1 may release HEL1 in the depicted embodiment (block 422). This may enable one of the waiting data accessors (if any) to acquire HEL1 and perform its own critical section (which in turn may comprise zero or more help sessions) in various embodiments.

Figure 5:
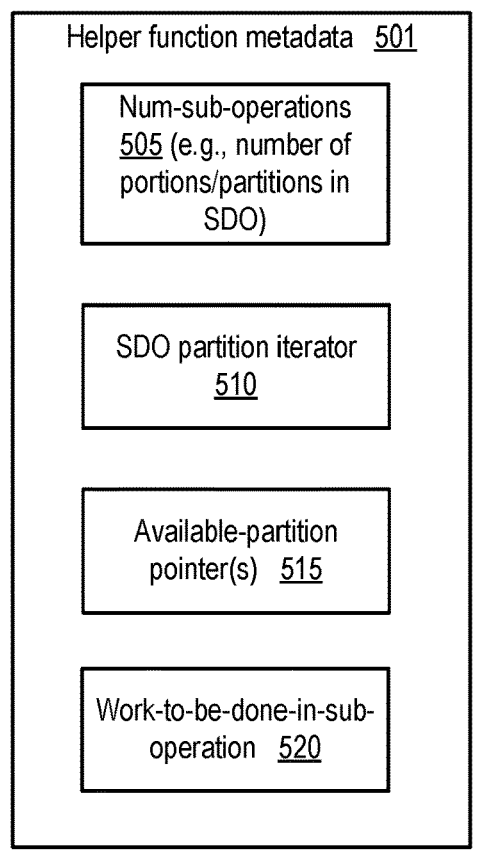
FIG. 5 illustrates example metadata associated with helper functions of help-enabled locks, according to at least some embodiments.

FIG. 5 illustrates example metadata associated with helper functions of help-enabled locks, according to at least some embodiments. Such metadata may be generated, for example, by a holder of a help-enabled lock (similar to HEL 132 of FIG. 1), and shared with potential helpers. The metadata 502 may for example include an indication of the number of sub-operations 505 which the HEL holder is willing to enable helpers to perform. The number of sub-operations may, for example, correspond to the number of portions/partitions into which a shared data object (SDO) protected using HEL1 is divided for the purposes of a help session. In at least some embodiments, the metadata 501 may include an iterator 510, e.g., a mechanism which can be used by a helper to identify its portion of the work to be done in the critical section. Note that at least in one embodiment, respective sub-operations may not necessarily involve processing distinct portions of a shared data object; instead, for example, the respective sub-operations may involve performing different computations on the same data.

In at least some embodiments, the metadata 502 may include one or more pointers 515 (similar in concept to the nextRegionIndex variable of EPS1 introduced above) to available partitions or sub-operations, which can be used by helpers to claim specific sub-operations. In various embodiments, such pointers may be modified by individual helpers, e.g., under the protection of a synchronization mechanism, to indicate that they have claimed the corresponding sub-operations. In at least some implementations, an atomic update operation such as a fetch-and-increment or fetch-and-update operation may be used to modify the pointer(s). In at least one embodiment, the metadata 501 may also include an indication 520 (such as the logical equivalent of a function pointer, or a function name) of the actual work that is to be done by helpers in their respective sub-operations. Note that at least in some embodiments, not all the helpers may perform the same functionality in their respective sub-operations—e.g., the work-to-be-done metadata may in effect comprise an array of pointers to different functions, with each function to be applied to a respective portion (or all) of a shared data object. Other helper function metadata element combinations may be used in some embodiments than those shown in FIG. 5.

Figure 6:
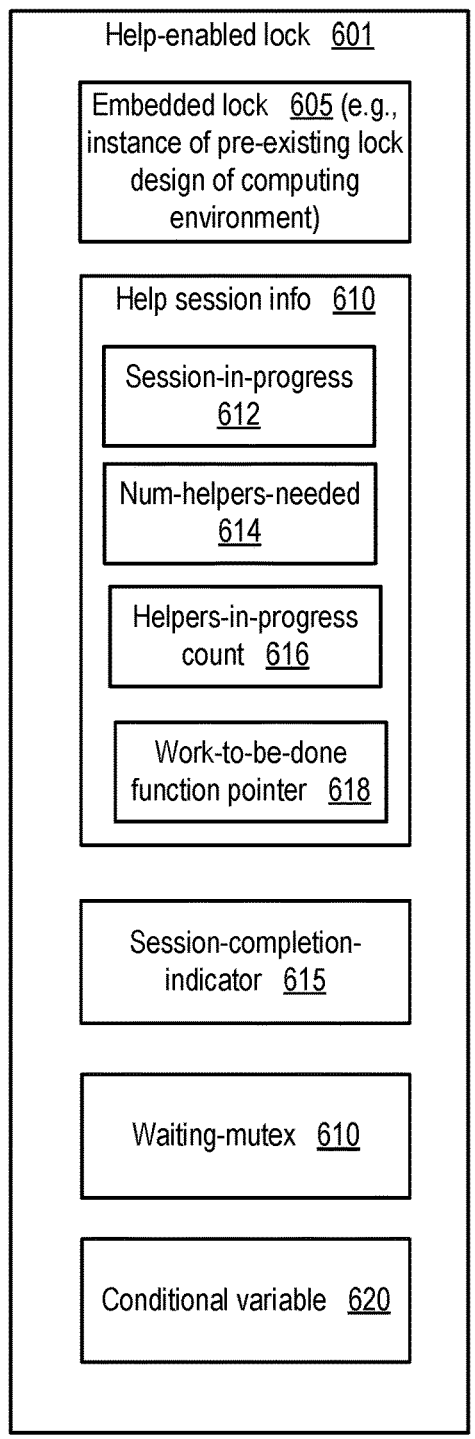
FIG. 6 illustrates contents of an example data structure used to represent a help-enabled lock, according to at least some embodiments.

A number of different data structures may be used to represent help-enabled locks similar to those discussed earlier, such as HEL 132 of FIG. 1, in various embodiments. FIG. 6 illustrates contents of an example data structure used to represent a help-enabled lock, according to at least some embodiments. A data structure for a help-enabled lock 601 may, for example, comprise an instance of an embedded lock 605 (as in the pseudo-code section EPS2 discussed above). Such an embedded lock 605 may use a pre-existing lock design of the computing environment in which the data accessors operate in some embodiments. The HEL design may be able to leverage the lock and unlock functionality of the embedded lock in some embodiments, e.g., as discussed above in the context of EPS2, in effect augmenting the embedded lock with help-enabled functionality, without requiring the code of the embedded lock to be modified or even re-compiled. A help-session-information element 610 of the HEL 601 may include, for example, an indication (session-in-progress 612) whether a help session is currently in progress or not, an indication of the maximum number of helpers needed (num-helpers-needed 614) during the help session, a count 616 of helpers currently performing sub-operations of the critical section, and/or a work-to-be-done function pointer 618 in some embodiments.

In some embodiments, the HEL data structure may include a session-completion-indicator 615, used by the HEL holder to signal when a help session associated with the HEL is complete. In at least one embodiment, one or more additional synchronization-related primitives, such as a waiting mutex (mutual exclusion lock) 610 and or a conditional variable 620 (which may be used in conjunction with the waiting mutex) may be included as part of an HEL data structure. Such a mutex and/or conditional variable may be used, for example (as in EPS2) by the HEL holder to communicate with waiting data accessors regarding the completion of a help session. In at least one embodiment, an HEL data structure may comprise a different combination of elements than those shown in FIG. 6. In one embodiment, for example, an embedded lock may not be included, a mutex may not be included, and/or a conditional variable may not be included.

Figure 7:
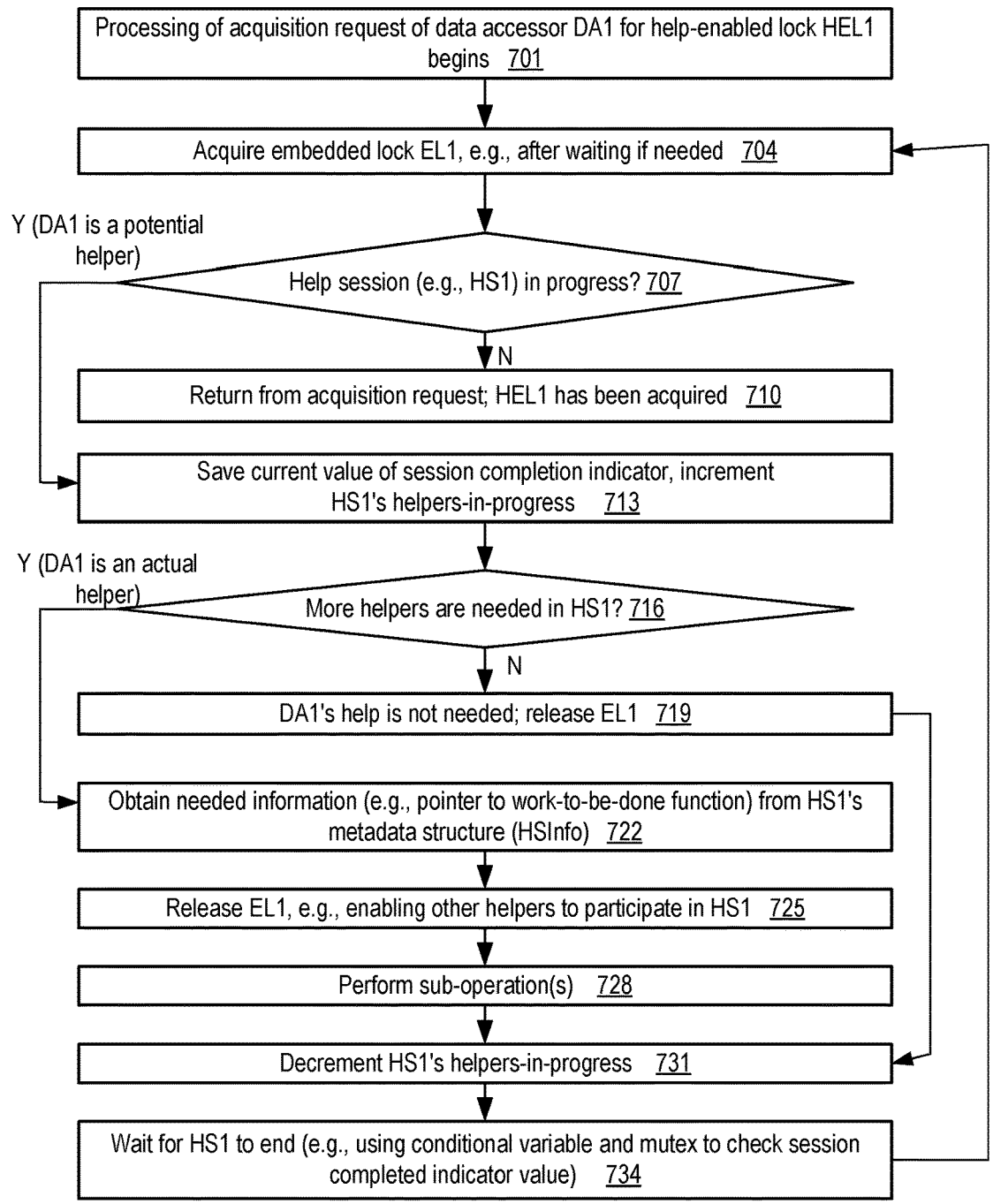
FIG. 7 is a flow diagram illustrating aspects of operations which may be performed to process an acquisition request for a help-enabled lock, according to at least some embodiments.

FIG. 7 is a flow diagram illustrating aspects of operations which may be performed to process an acquisition request for a help-enabled lock, according to at least some embodiments. In the depicted embodiment, a help enabled lock design in which a given instance of an HEL includes an embedded lock, similar to the approach illustrated in EPS2, may be used; the operations illustrated in FIG. 7 correspond approximately to the lock( ) function beginning on line 86 of EPS2. The processing of an acquisition request (e.g., the equivalent of HEL1 lock( ) of a given data accessor DA1 for an instance of a help-enabled lock HEL1 may begin in block 701 of FIG. 7. DA1 may acquire the embedded lock EL1 of HEL1, e.g., after waiting if needed (block 704).

After acquiring EL1, DA1 may attempt to determine whether a help session associated with a critical section protected by HEL1 is currently underway (block 707). If such a help session is not in progress, this may indicate that DA1 has acquired HEL1 itself; that is, the acquisition of EL1 at a point of time when no help session is currently in progress may correspond to the acquisition of HEL1 in some embodiments. The processing of the acquisition request may be complete at this point (block 710), and DA1 may proceed to implement its critical section (and may, at least potentially, initiate one or more help sessions to help speed up the critical section).

If a help session HS1 is underway (as determined in operations corresponding to block 707), DA1 may be a potential helper for the holder of HEL1 in the depicted embodiment. DA1 may, for example, save a current value of a session completion indicator and increment a helpers-in-progress variable in some embodiments (block 713). The incrementing of the helpers-in-progress indicator may be performed in at least some implementations using an atomic operation such as a fetch-and-add operation or a fetch-and-increment operation supported by the computing environment's hardware and/or operating system.

In embodiments in which the holder of HEL1 may impose a limit on the maximum number of helpers, DA1 may check whether more helpers are needed in the current help session HS1 (block 716). If no more helpers are needed, DA1 may release EL1 (block 719), decrement the helpers-in-progress count (block 731), and wait for the help session to end (block 734) before again attempting to acquire HEL1 (block 701 onwards) in the depicted embodiment. In at least some embodiments, a mutex associated with a conditional variable (for which a broadcast primitive may be used in some cases by the HEL1 holder to signal to waiting data accessors like DA1 when HS1 ends) may be used to check a session completion indicator.

If a result of the test corresponding to block 716 indicates that more helpers are needed for HS1, DA1 may become an active helper in the depicted embodiment. As such, DA1 may obtain needed information for its portion or sub-operation of the critical section (block 722), such as a pointer to a work-to-be-done function, from HS1's meta-data, in various embodiments. DA1 may then release the embedded lock EL1, e.g., enabling other helpers to participate in the helping session HS1 (block 725).

As an active helper, DA1 may then proceed to perform its sub-operation of the session HS1 (block 728). After completing its sub-operation, DA1 may decrement HS1's helpers-in-progress indicator (block 731), e.g., using an atomic operation such as a fetch-and-decrement or fetch-and-add operation in various embodiments. DA1 may then wait for the current help session HS1 to end (block 734), and again attempt to acquire HEL1 after the session ends (e.g., once again attempting to acquire HEL1 by issuing HEL1.lock( ), resulting in operations corresponding to block 701 onwards) in the depicted embodiment.

Figure 8:
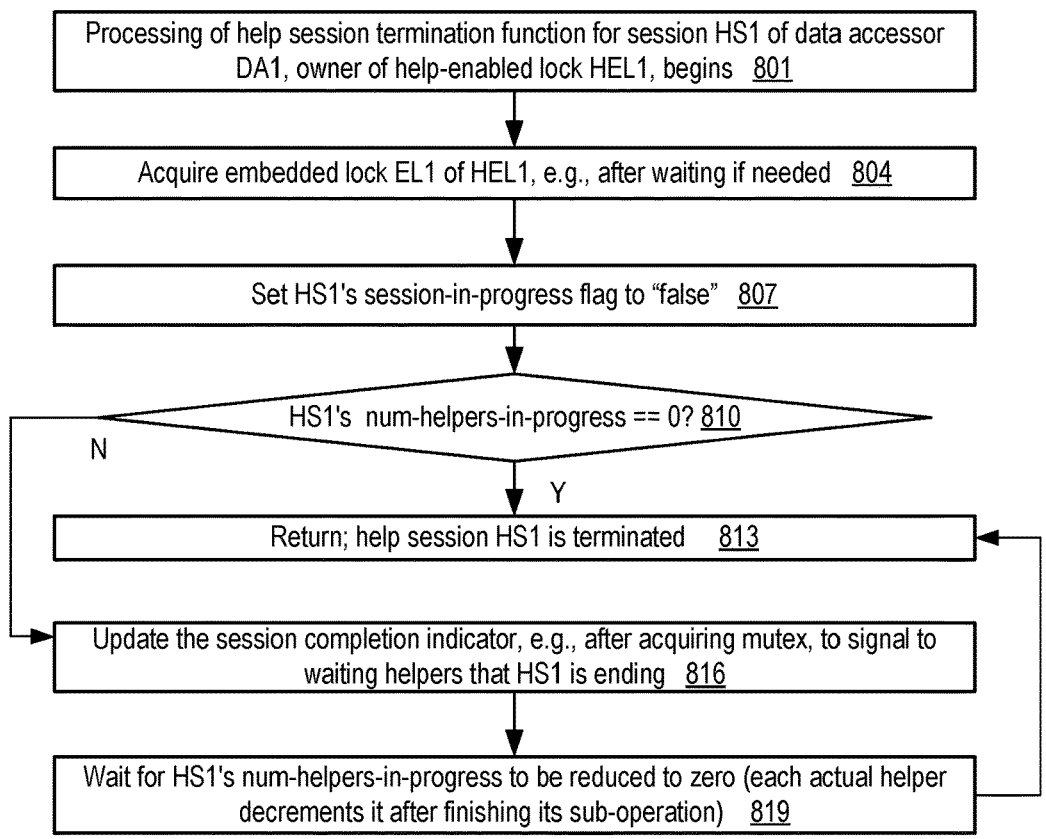
FIG. 8 is a flow diagram illustrating aspects of operations which may be performed to terminate a help session associated with a help-enabled lock, according to at least some embodiments.

FIG. 8 is a flow diagram illustrating aspects of operations which may be performed to terminate a help session associated with a help-enabled lock, according to at least some embodiments. In the depicted embodiment, a help enabled lock design in which a given instance of an HEL includes an embedded lock, similar to the approach illustrated in EPS2, may be used; the operations illustrated in FIG. 8 correspond approximately to the stopHelping( ) function beginning on line 159 of EPS2. As shown in block 801 of FIG. 8, the processing of a help session termination function for a helping session HS1 initiated by a data accessor DA1 which is the owner of a help-enabled lock HEL1 may be begun. The embedded lock EL1 of HEL1 may be acquired by DA1, e.g., after waiting if needed (block 804).

DA1 may then set HS1's session-in-progress flag or indicator to "false" in the depicted embodiment, to signal to any potential new helpers that they cannot participate in HS1 (block 807). If no helpers are in the process of performing sub-operations of the critical section, as determined in block 810, no further work may be needed, DA1 may return from the function it entered in operations corresponding to block 801, and the help session HS1 may be terminated (block 813). If there are some helpers that have begun but not yet finished their sub-operations, as also detected in block 810, a session completion indicator (e.g., a num-sessions-completed counter) may be updated, to signal to any waiting helpers that the session which they participated in has terminated (block 816) in the depicted embodiment. In at least some embodiments, such updates may be performed after acquiring a mutex associated with HEL1 After updating the session completion indicator, in at least some embodiments DA1 may wait for any outstanding unfinished helpers to complete their sub-operations and decrement the num-helpers-in-progress indicator of active helpers to zero (block 819). After all the helpers have signaled that they are finished, the help session HS1 may be considered terminated.

It is noted that in various embodiments, at least some operations other than those illustrated in the flow diagrams of FIG. 4, FIG. 7 and/or FIG. 8 may be performed to implement the help-enabled locking techniques described above. Some of the operations shown may not be implemented in some embodiments, may be implemented in a different order, or in parallel rather than sequentially.

In various embodiments, implementations of the help-enabled locking techniques described above may be incorporated into dynamic locking libraries made available within various versions of operating systems (such as versions of Linux). In at least one embodiment, a set of interposition libraries (similar to the LD_PRELOAD libraries of some versions of Linux) that expose standard locking application programming interfaces (APIs) may be used for exposing the algorithms to applications. In an embodiment in which interposition libraries are used, the application code may not have to be modified or recompiled to take advantage of the capabilities of the algorithms described herein; instead, the algorithms may be deployed simply by changing an environment variable (e.g., the LD_PRELOAD environment variable).

Figure 9:
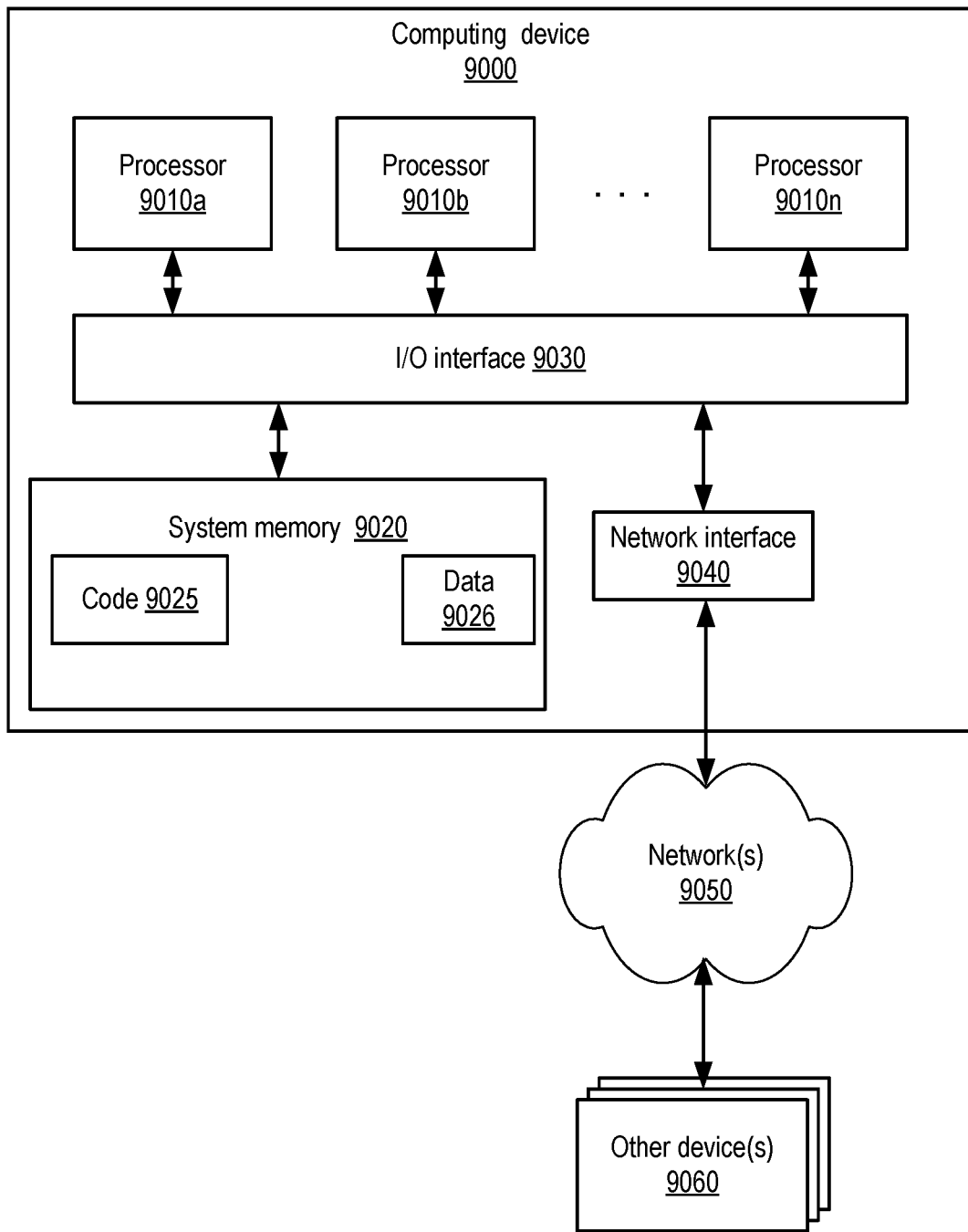
FIG. 9 is a block diagram illustrating an example computing device that may be used in at least some embodiments.

In at least some embodiments, a server that implements a portion or all of one or more of the technologies described herein may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors. NUMA architectures may be used in some embodiments.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 (which may for example comprise the code for help-enabled lock algorithms) and data 9026 (which may for example include the shared data objects whose accesses are protected using the help-enabled lock algorithms, locking related metadata and the like).

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, one or more computer-accessible storage media may comprise instructions that when executed on or across one or more processors implement the techniques described. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Figure 10:
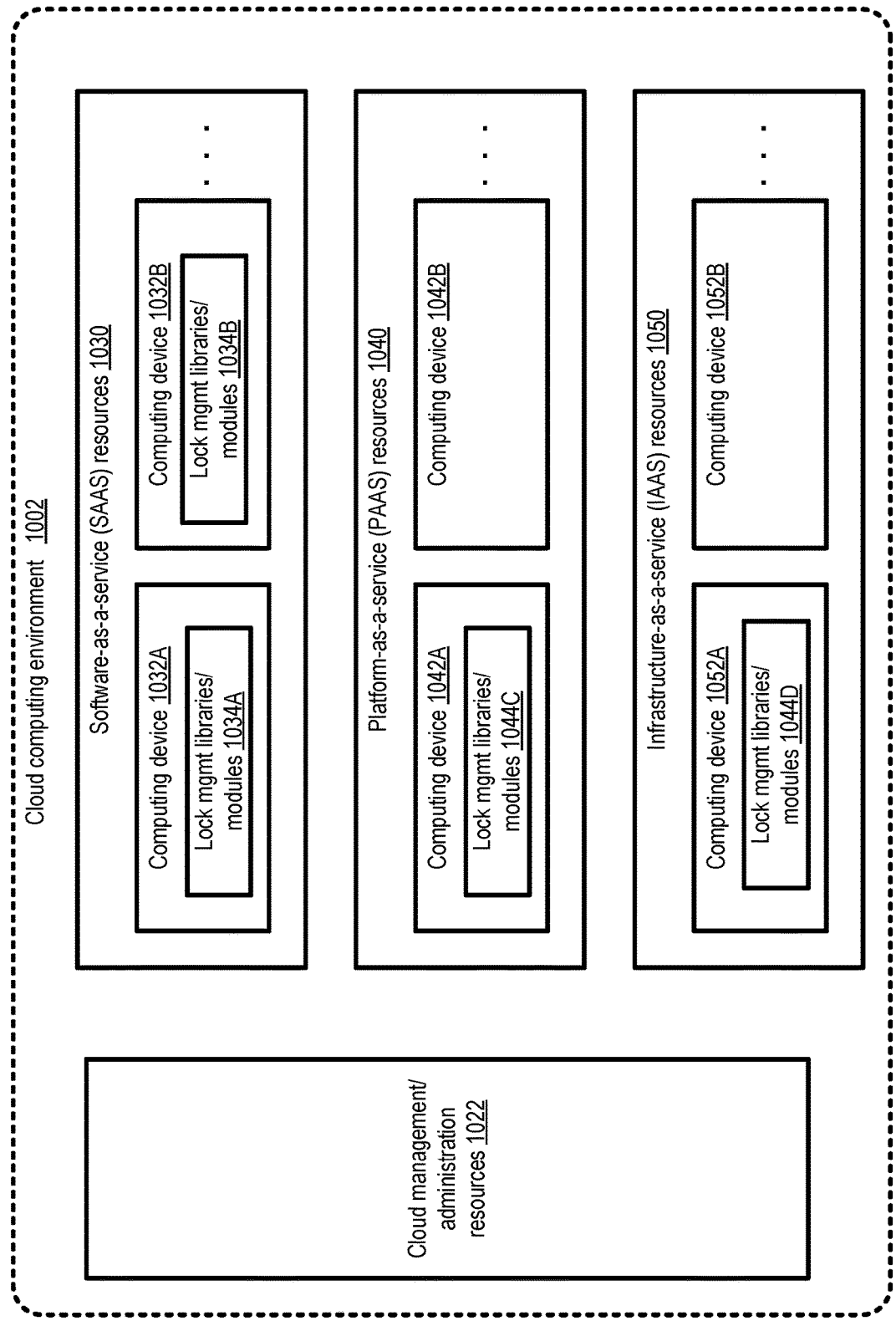
FIG. 10 illustrates an example cloud computing environment in which help-enabled locking techniques may be employed, according to at least some embodiments.

FIG. 10 illustrates an example cloud computing environment in which help-enabled locking techniques may be employed in at least some embodiments. As shown, cloud computing environment 1002 may include cloud management/administration resources 1022, software-as-a-service (SAAS) resources 1030, platform-as-a-service (PAAS) resources 1040 and/or infrastructure-as-a-service (IAAS) resources 1050. Individual ones of these subcomponents of the cloud computing environment 1002 may include a plurality of computing devices (e.g., devices similar to device 9000 shown in FIG. 9) distributed among one or more data centers in the depicted embodiment, such as devices 1032A, 1032B, 1042A, 1042B, 1052A, and 1052B. A number of different types of network-accessible services, such as database services, customer-relationship management services, machine learning services and the like may be implemented using the resources of the cloud computing environment in various embodiments.

In the depicted embodiment, clients or customers of the cloud computing environment 1002 may choose the mode in which they wish to utilize one or more of the network-accessible services offered. For example, in the IAAS mode, in some embodiments the cloud computing environment may manage virtualization, servers, storage and networking on behalf of the clients, but the clients may have to manage operating systems, middleware, data, runtimes, and applications. If, for example, a client wishes to use IAAS resources 1050 for some desired application for which locking techniques of the kind described earlier are used, the clients may identify one or more virtual machines implemented using computing devices 1052 (e.g., 1052A or 1052B) as the platforms on which the applications are being run, and ensure that the appropriate lock management libraries/modules 1044D are installed/available on those virtual machines. In the PAAS mode, clients may be responsible for managing a smaller subset of the software/hardware stack in various embodiments: e.g., while the clients may still be responsible for application and data management, the cloud environment may manage virtualization, servers, storage, network, operating systems as well as middleware. Lock management libraries/modules such as 1044C may be pre-deployed to, and run at, at least some PAAS resources (e.g., 1042A, 1042B etc.) for applications on various clients in different embodiments. In the SAAS mode, the cloud computing environment may offer applications as a pre-packaged service (including the underlying lock management components such as 1034A or 1034B), managing even more of the software/hardware stack in various embodiments—e.g., clients may not even have to explicitly manage applications or data.

The administration resources 1022 may perform resource management-related operations (such as provisioning, network connectivity, ensuring fault tolerance and high availability, and the like) for all the different modes of cloud computing that may be supported in some embodiments. Clients may interact with various portions of the cloud computing environment using a variety of programmatic interfaces in different embodiments, such as a set of APIs (application programming interfaces), web-based consoles, command-line tools, graphical user interfaces and the like. Note that other modes of providing services at which the locking algorithms described earlier may be supported in at least some embodiments, such as hybrid public-private clouds and the like.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    performing, at one or more computing devices:
        acquiring, by a first data accessor of a plurality of data accessors, a first lock associated with a first critical section, wherein the first critical section comprises one or more operations including a first operation;
        initiating, by the first data accessor, a first help session associated with the first operation, wherein the first help session comprises implementing, by at least a second data accessor which (a) has requested the first lock and (b) has not been granted the first lock, one or more sub-operations of the first operation;
        wherein the second data accessor implements the one or more sub-operations of the first operation while waiting to acquire the first lock; and
        releasing the first lock by the first data accessor after at least the first operation has been completed.

2. The method as recited in claim 1, wherein the first operation comprises accessing a first data object, wherein an individual sub-operation of the one or more sub-operations comprises accessing a respective portion of the first data object, the method further comprising performing, at the one or more computing devices:
    indicating, by the first data accessor to the second data accessor, an iterator to identify at least one portion of the first data object to be accessed by the second data accessor.

3. The method as recited in claim 1, wherein the first operation comprises accessing a first data object, wherein an individual sub-operation of the one or more sub-operations comprises applying a function to a respective portion of the first data object, the method further comprising performing, at the one or more computing devices:
  indicating, by the first data accessor to the second data accessor, a function to be applied to at least one portion of the first data object by the second data accessor.

4. The method as recited in claim 1, further comprising performing, at the one or more computing devices:
  implementing, by the first data accessor while holding the first lock, one or more sub-operations of the first operation.

5. The method as recited in claim 1, wherein the first critical section comprises a second operation, the method further comprising performing, at the one or more computing devices:
  initiating, by the first data accessor, a second help session associated with the second operation, wherein the second help session comprises implementing, by a data accessor other than the first accessor, one or more sub-operations of the second operation.

6. The method as recited in claim 5, wherein the first operation comprises accessing a first data object, wherein the one or more sub-operations of the first operation comprise a first sub-operation, wherein the second operation comprises accessing a second data object, wherein the one or more sub-operations of the second operation comprise a second sub-operation, wherein the first sub-operation comprises accessing a first portion of the first data object, and wherein the second sub-operation comprises accessing a first portion of the second data object.

7. The method as recited in claim 1, wherein the first critical section comprises a second operation divisible into sub-operations, the method further comprising performing, at the one or more computing devices:
  initiating, by the first data accessor, a second help session associated with the second operation; and
  implementing, by the first data accessor, the second operation, wherein the second help session does not comprise another data accessor implementing a sub-operation of the second operation.

8. The method as recited in claim 1, further comprising performing, at the one or more computing devices:
  determining, by a third data accessor during the first help session, based at least in part on a helper count limit set by the first data accessor, that the third data accessor is not to perform a sub-operation of the first operation.

9. The method as recited in claim 1, wherein initiating the first help session comprises releasing, by the first data accessor, a second lock associated with the first lock, the method further comprising performing, by the second data accessor at the one or more computing devices:
  acquiring the second lock prior to storing an indication that a first sub-operation of the first operation is going to be implemented by the second data accessor; and
  releasing the second lock prior to implementing the first sub-operation.

10. The method as recited in claim 1, further comprising performing, at the one or more computing devices:
  utilizing, by the first data accessor, a broadcast primitive associated with a conditional variable to notify one or more other data accessors, including the second data accessor, that the first help session has ended.

11. A system, comprising:
  one or more computing devices;
  wherein the one or more computing devices include instructions that upon execution on a processor cause a first data accessor of a plurality of data accessors at the one or more computing devices to:
    obtain a first lock associated with a first critical section, wherein the first critical section comprises one or more operations including a first operation;
    initiate a first help session associated with the first operation, wherein the first help session comprises implementing, by at least a second data accessor waiting to acquire the first lock, one or more sub-operations of the first operation, wherein at least one of the one or more sub-operations of the first operation is performed in parallel with at least one other sub-operation of the first operation; and
    release the first lock after at least the first operation has been completed.

12. The system as recited in claim 11, wherein the first operation comprises accessing a first data object, wherein an individual sub-operation of the one or more sub-operations comprises accessing a respective portion of the first data object, wherein the instructions upon execution on a processor cause the first data accessor to:
  indicate, to at least the second data accessor, an iterator to identify at least one portion of the first data object.

13. The system as recited in claim 11, wherein the first operation comprises accessing a first data object, wherein an individual sub-operation of the one or more sub-operations comprises applying a function to a respective portion of the first data object, wherein the instructions upon execution on a processor cause the first data accessor to:
  indicate, to at least the second data accessor, a function to be applied to at least one portion of the first data object.

14. The system as recited in claim 11, wherein the instructions upon execution on a processor cause a third accessor of the one or more data accessors to:
  determine, during the first help session, based at least in part on a helper count limit set by the first data accessor, that the third data accessor is not to perform a sub-operation of the first operation.

15. The system as recited in claim 11, wherein initiation of the first help session comprises releasing, by the first data accessor, a second lock associated with the first lock, wherein the instructions upon execution on a processor cause the second accessor to:
  acquire the second lock prior to storing an indication that a first sub-operation of the first operation is going to be implemented by the second data accessor; and
  release the second lock prior to implementing the first sub-operation.

16. One or more non-transitory computer-accessible storage media storing program instructions that when executed on or across one or more processors cause a first data accessor of a plurality of data accessors to:
  acquire a first lock associated with a first critical section, wherein the first critical section comprises one or more operations including a first operation;
  initiate a first help session associated with the first operation, wherein the first help session comprises implementing, by at least a second data accessor which has not acquired the first lock, one or more sub-operations of the first operation; and
  release the first lock after at least the first operation including the one or more sub-operations have been completed.

17. The one or more non-transitory computer-accessible storage media as recited in claim 16, wherein the first operation comprises accessing a first data object, wherein an individual sub-operation of the one or more sub-operations comprises accessing a respective portion of the first data object, wherein the instructions when executed on or across the one or more processors cause the first data accessor to:
- indicate, to at least the second data accessor, an iterator to identify at least one portion of the first data object.

18. The one or more non-transitory computer-accessible storage media as recited in claim 16, wherein the first operation comprises accessing a first data object, wherein an individual sub-operation of the one or more sub-operations comprises applying a function to a respective portion of the first data object, wherein the instructions when executed on or across the one or more processors cause the first data accessor to:
- indicate, to at least the second data accessor, a function to be applied to at least one portion of the first data object.

19. The one or more non-transitory computer-accessible storage media as recited in claim 16, wherein the instructions when executed on or across the one or more processors cause a third accessor of the one or more data accessors to:
- determine, during the first help session, based at least in part on a helper count limit set by the first data accessor, that the third data accessor is not to perform a sub-operation of the first operation.

20. The one or more non-transitory computer-accessible storage media as recited in claim 16, wherein the first data accessor comprises a first thread of a multi-threaded program, and wherein the second data accessor comprises a second thread of the multi-threaded program.

\* \* \* \* \*